US012573534B2

(12) United States Patent
Itani et al.

(10) Patent No.: US 12,573,534 B2
(45) Date of Patent: Mar. 10, 2026

(54) COIL COMPONENT AND METHOD OF MANUFACTURING COIL COMPONENT

(71) Applicant: Murata Manufacturing Co., Ltd., Kyoto-fu (JP)

(72) Inventors: Yasuhiro Itani, Nagaokakyo (JP); Seiji Karimori, Nagaokakyo (JP); Katsuyuki Takahashi, Nagaokakyo (JP); Masashi Miyamoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 60 days.

(21) Appl. No.: 18/776,728

(22) Filed: Jul. 18, 2024

(65) Prior Publication Data

US 2024/0371560 A1 Nov. 7, 2024

Related U.S. Application Data

(63) Continuation of application No. 16/712,787, filed on Dec. 12, 2019, now Pat. No. 12,073,970.

(30) Foreign Application Priority Data

Dec. 26, 2018 (JP) ................................ 2018-242671

(51) Int. Cl.
*H01F 17/04* (2006.01)
*H01F 27/29* (2006.01)

(52) U.S. Cl.
CPC ..... *H01F 17/045* (2013.01); *H01F 2017/048* (2013.01); *H01F 27/292* (2013.01)

(58) Field of Classification Search
CPC . H01F 17/045; H01F 27/292; H01F 2017/048
See application file for complete search history.

(56) References Cited

U.S. PATENT DOCUMENTS

2016/0118183 A1 4/2016 Wada
2016/0379756 A1* 12/2016 Yamakita .............. H01F 41/069 242/439.1

(Continued)

FOREIGN PATENT DOCUMENTS

CN 106298228 A 1/2017
JP 2000-150282 A 5/2000

(Continued)

OTHER PUBLICATIONS

An Office Action; "Notice of Reasons for Refusal," mailed by the Japanese Patent Office on Apr. 27, 2021, which corresponds to Japanese Patent Application No. 2018-242671 and is related to U.S. Appl. No. 16/712,787 with English language translation.

*Primary Examiner* — Malcolm Barnes
(74) *Attorney, Agent, or Firm* — Studebaker Brackett PLLC

(57) ABSTRACT

A coil component includes a drum-shaped core including a core part having a circumferential surface including a first side surface and a second side surface parallel to each other; and a coil including two wires wound around the core part in the same direction. The coil has a first twisted wire part having the two wires twisted together on the first side surface, and a second twisted wire part having the two wires twisted together on the second side surface. The first twisted wire part and the second twisted wire part are identical in shape.

4 Claims, 13 Drawing Sheets

(56) References Cited

U.S. PATENT DOCUMENTS

| | | | | |
|---|---|---|---|---|
| 2017/0025212 | A1* | 1/2017 | Jerez | H01F 27/29 |
| 2017/0069425 | A1* | 3/2017 | Yamakita | B65H 54/026 |
| 2017/0140858 | A1* | 5/2017 | Takagi | H01F 27/2828 |
| 2018/0097497 | A1* | 4/2018 | Kobayashi | H03H 7/427 |
| 2018/0374632 | A1* | 12/2018 | Kawahara | H01F 27/2823 |
| 2020/0013534 | A1* | 1/2020 | Dinh | H01F 17/045 |
| 2020/0111601 | A1 | 4/2020 | Ohi et al. | |

FOREIGN PATENT DOCUMENTS

| | | | |
|---|---|---|---|
| JP | 2010-147132 | A | 7/2010 |
| JP | 2014-216525 | A | 11/2014 |
| JP | 2017508298 | A | 3/2017 |

* cited by examiner

COIL COMPONENT AND METHOD OF MANUFACTURING COIL COMPONENT

CROSS-REFERENCE TO RELATED APPLICATION

This application is a Continuation of U.S. patent application Ser. No. 16/712,787 filed Dec. 12, 2019, which claims benefit of priority to Japanese Patent Application No. 2018-242671, filed Dec. 26, 2018, the entire content of which is incorporated herein by reference.

BACKGROUND

Technical Field

The present disclosure relates to a coil component and a method of manufacturing the coil component.

Background Art

As coil components, wire-wound common mode choke coils have been used. The wire-wound common mode choke coil has a core having a core part, and a plurality of wires wound around the core part. In some wire-wound common mode choke coils, two wires twisted together are wound around the core part as described, for example, in Japanese Unexamined Patent Application Publication No. 2014-216525.

SUMMARY

When the core part with wires wound therearound has a polygonal cross section orthogonal to an axial direction, winding irregularities may occur, depending on the twisted state of the wires wound around the core. For example, the wires may be deformed, the twisted state may be changed, or the twisted wires may be untwisted. The occurrence of such winding irregularities also causes unevenness in quality of coil components.

Accordingly, the present disclosure provides a coil component and a method of manufacturing a coil component allowing a stable wound state of wires.

A coil component according to a preferred embodiment of the present disclosure includes a drum-shaped core including a core part, the core part having a circumferential surface including a first surface and a second surface parallel to each other; and a coil including two wires wound around the core part in the same direction. The coil has a first twisted wire part having the two wires twisted together on the first surface and a second twisted wire part having the two wires twisted together on the second surface. The first twisted wire part and the second twisted wire part are identical in shape.

According to this structure, the wound state of the two wires can be stabilized, and winding irregularities can be reduced.

According to the coil component of a preferred embodiment of the present disclosure, a coil component and a method of manufacturing the coil component allowing a stable wound state of wires can be provided.

Other features, elements, characteristics and advantages of the present disclosure will become more apparent from the following detailed description of preferred embodiments of the present disclosure with reference to the attached drawings.

DETAILED DESCRIPTION

In the following, each embodiment is described. In the accompanying drawings, components may be enlarged for ease of understanding. The dimensional ratio of each component may be different from the actual dimensional ratio or the dimensional ratio in other drawings. Also, in cross-sectional views, hatching of some components may be omitted for ease of understanding.

Figure 1:
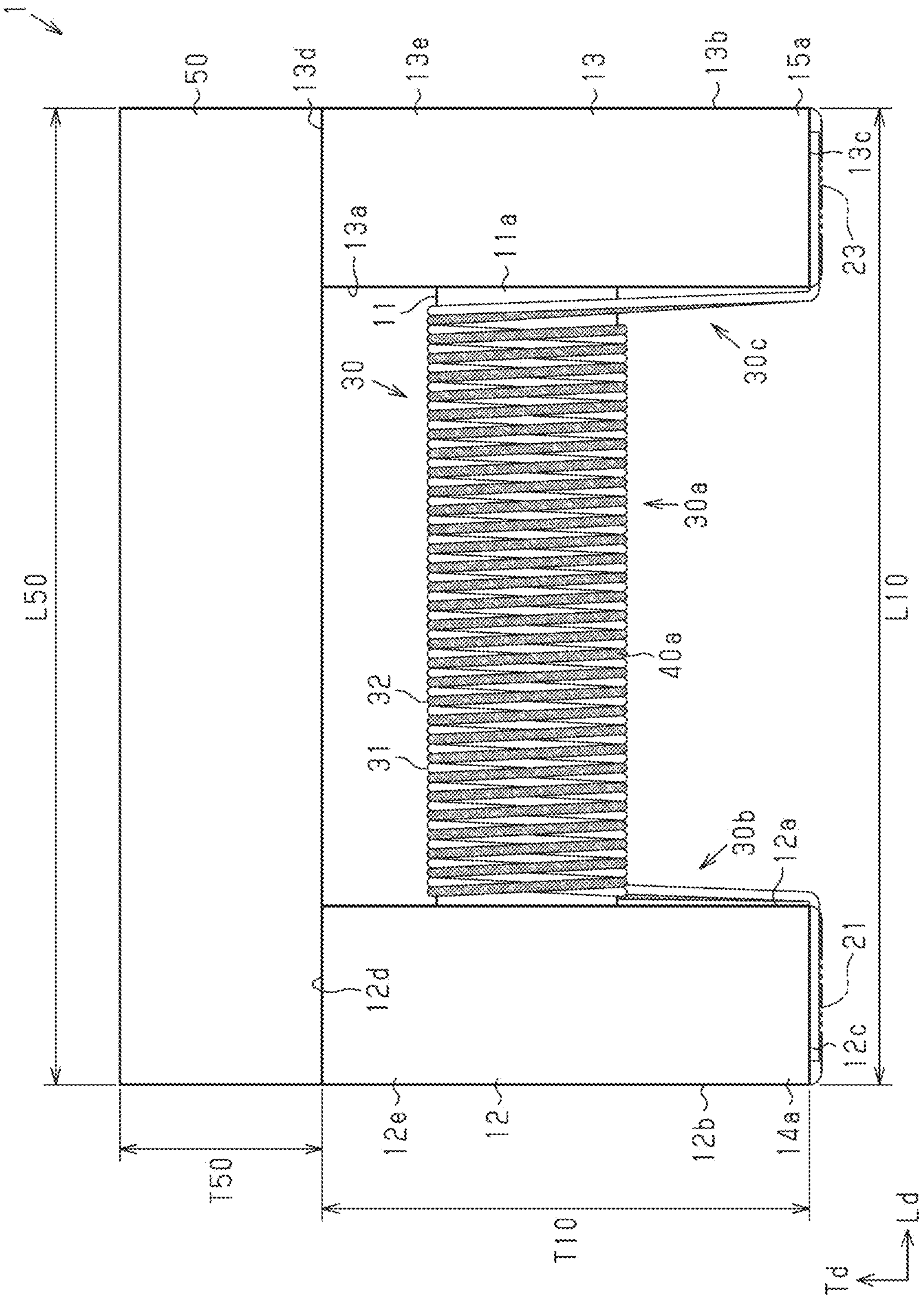
FIG. 1 is a schematic side view of a coil component of one embodiment.
Figure 2:
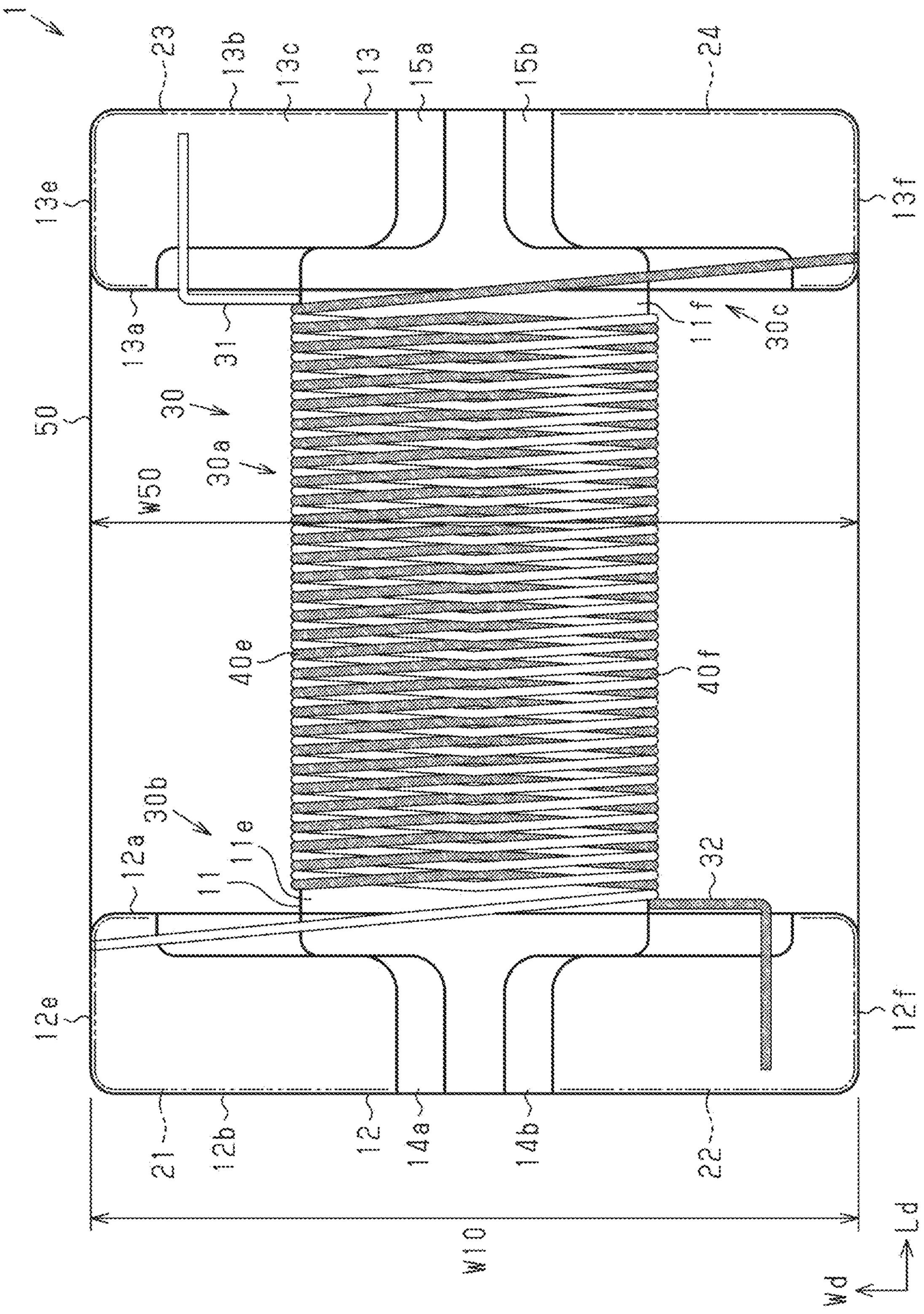
FIG. 2 is a schematic bottom view of the coil component of the embodiment.

FIG. 1 is a schematic side view of a coil component 1. FIG. 2 is a schematic bottom view of the coil component 1. As depicted in FIG. 1 and FIG. 2, the coil component 1 includes a drum-shaped core 10 having a substantially drum shape, and a coil 30 wound around the drum-shaped core 10. This coil component 1 is, for example, a common mode choke coil.

The drum-shaped core 10 is made of a non-conductive material and, more specifically, a non-magnetic material such as alumina, a magnetic material such as nickel-zinc (Ni—Zn) based ferrite, resin, or the like. Examples of resin include resin containing magnetic powder such as metal powder or ferrite powder, resin containing non-magnetic powder such as silica powder, and resin not containing any filler.

Figure 5:
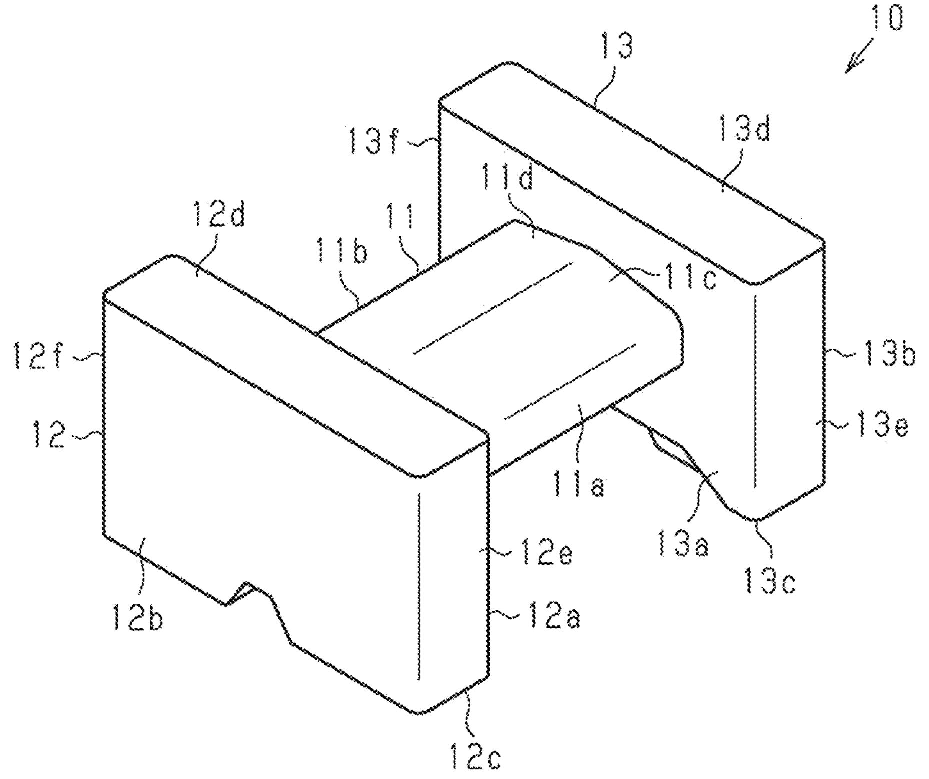
FIG. 5 is a perspective view of a drum-shaped core.

As depicted in FIG. 1, FIG. 2, and FIG. 5, the drum-shaped core 10 includes a core part 11, a first flange part 12 provided at a first end part of the core part 11 in an axial direction thereof, and a second flange part 13 provided at a second end part thereof. The core part 11, the first flange part 12, and the second flange part 13 are integrally formed. In the specification, the axial direction of the core part 11 is taken as a "length direction Ld". Of directions orthogonal to the "length direction Ld", a direction perpendicular to a surface of, for example, a circuit board where the coil component 1 is mounted is taken as a "height direction Td", and a direction orthogonal to both of the "length direction Ld" and the "height direction Td" is taken as a "width direction Wd".

Figure 3:
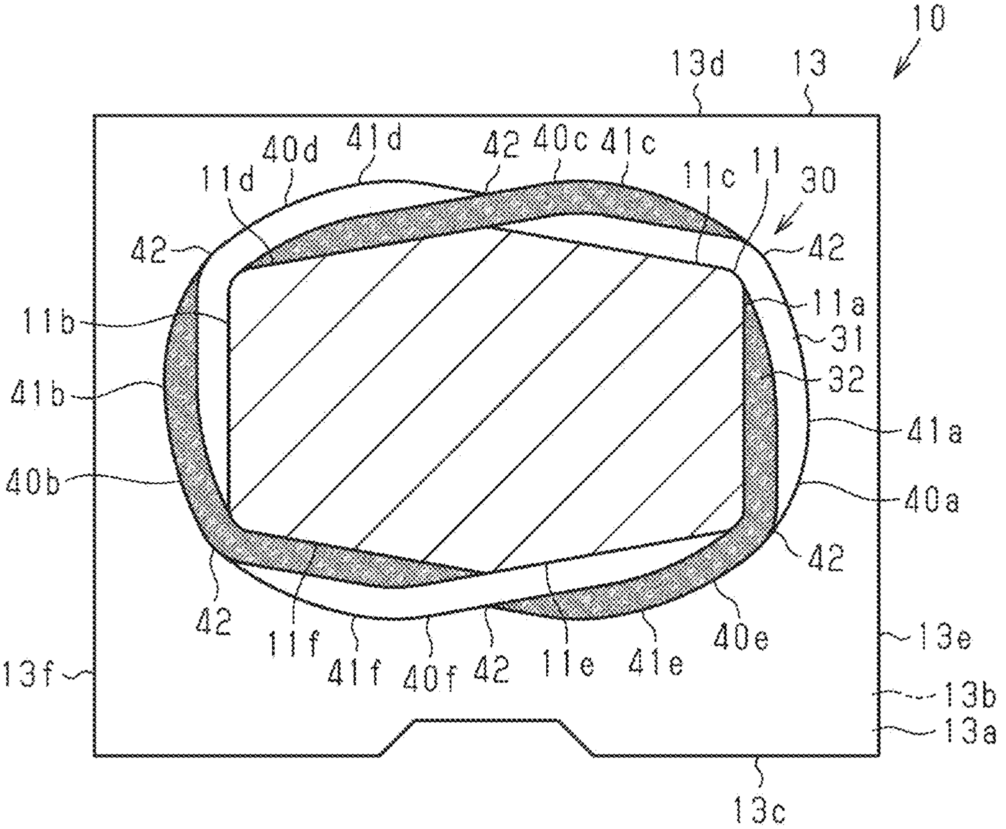
FIG. 3 is a schematic cross-sectional view of a core part and one turn of a coil.
Figure 6:
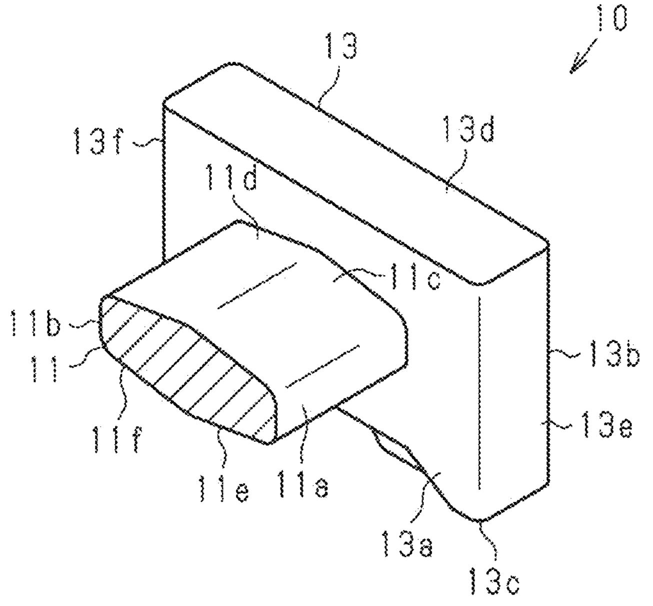
FIG. 6 is a cross-sectional perspective view of the core part of the drum-shaped core.

As depicted in FIG. 3 and FIG. 6, the core part 11 has a cross section orthogonal to the axial direction having a substantially polygonal shape, and the cross section has a substantially hexagonal shape in the present embodiment. In the specification, the "substantially polygonal shape" may have corners chamfered, may have corners rounded, or may have sides partially curved.

In the present embodiment, the core part 11 has paired side surfaces 11*a* and 11*b* facing each other in the width direction Wd of the drum-shaped core 10, and paired upper surfaces 11*c* and 11*d* and paired lower surfaces 11*e* and 11*f* facing in the height direction Td. In the present embodiment, the paired side surfaces 11*a* and 11*b* of the core part 11 are parallel to each other. That is, the core part 11 has the paired side surfaces 11*a* and 11*b* parallel to each other.

Paired surfaces parallel to each other, such as the side surfaces 11*a* and 11*b*, are taken as a first surface and a second surface. A portion forming a boundary between two surfaces adjacent to each other in a circumferential direction of the core part 11 is taken as a ridge part. The ridge part is a portion forming a boundary between a surface adjacent to the first surface and the first surface and a boundary between a surface adjacent to the second surface and the second surface. Since the ridge part is a portion forming a boundary between two surfaces adjacent to each other, a portion forming a boundary between the upper surfaces 11*c* and 11*d* and a portion forming a boundary between the lower surfaces 11*e* and 11*f* in the core part 11 of the present embodiment are also ridge parts. The ridge part may have a shape with surfaces connected to each other, or may have a shape with a portion where surfaces are connected to each other chamfered, rounded, curved, or recessed.

The drum-shaped core 10 is formed by, for example, burning a compact acquired by compressing the above-described non-conductive material. The compact is formed by using a metal mold. The compact is formed by pressurizing the non-conductive material filled in a filling hole provided in a metal mold die by an upper punch and a lower punch. The paired side surfaces 11*a* and 11*b* of the core part 11 are die surfaces in contact with the die at the time of pressure molding, and are surfaces formed of inner surfaces opposed to each other in the die. In the present embodiment, the drum-shaped core 10 is formed by taking the height direction Td of the drum-shaped core 10 as a thickness direction of the die. The filling hole for forming the drum-shaped core 10 is formed as penetrating through the die in the thickness direction. With the drum-shaped core 10 formed by the upper punch and the lower punch inserted in the filling hole, surfaces parallel to moving directions of the upper punch and the lower punch are formed by the die so as to be parallel to each other. The side surfaces 11*a* and 11*b* formed in the above-described manner can be made as opposed to each other. Thus, it can be said that the core part 11 of the drum-shaped core 10 has the side surfaces 11*a* and 11*b* opposed to each other. In the core part 11, surfaces except the side surfaces 11*a* and 11*b*, that is, the upper surfaces 11*c* and 11*d* and the lower surfaces 11*e* and 11*f*, are surfaces (punch surfaces) in contact with the punches at the time of pressure molding.

Also, the core part 11 of the present embodiment has a height in the height direction Td shorter than the length of the drum-shaped core 10 in the width direction Wd. Each of the angle formed by the side surface 11*a* and the upper surface 11*c*, the angle formed by the side surface 11*b* and the upper surface 11*d*, the angle formed by the side surface 11*a* and the lower surface 11*e*, and the angle formed by the side surface 11*b* and the lower surface 11*f* is, for example, approximately 100 degrees. Each of the angle formed by the paired upper surfaces 11*c* and 11*d* and the angle formed by the paired lower surfaces 11*e* and 11*f* is, for example, approximately 160 degrees.

As depicted in FIG. 1 and FIG. 2, the first flange part 12 has an inner surface 12*a* on a core part 11 side, an outer surface 12*b* oriented oppositely to the inner surface 12*a*, a lower surface 12*c* connecting the inner surface 12*a* and the outer surface 12*b*, an upper surface 12*d* oriented oppositely to the lower surface 12*c*, and two side surfaces 12*e* and 12*f* connecting the inner surface 12*a* and the outer surface 12*b* and connecting the lower surface 12*c* and the upper surface 12*d*. Similarly, the second flange part 13 has an inner surface 13*a* on a core part 11 side, an outer surface 13*b* oriented oppositely to the inner surface 13*a*, a lower surface 13*c* connecting the inner surface 13*a* and the outer surface 13*b*, an upper surface 13*d* oriented oppositely to the lower surface 13*c*, and two side surfaces 13*e* and 13*f* connecting the inner surface 13*a* and the outer surface 13*b* and connecting the lower surface 13*c* and the upper surface 13*d*. The lower surface and the upper surface are for the purpose of description and may not actually correspond to be oriented downward and upward, respectively, in the vertical direction.

The first flange part 12 has two leg parts 14*a* and 14*b* protruding to a lower surface 12*c* side. One leg part 14*a* is provided with a first terminal electrode 21, and the other leg part 14*b* is provided with a second terminal electrode 22. The first terminal electrode 21 and the second terminal electrode 22 are not electrically connected to each other. Similarly, the second flange part 13 has two leg parts 15*a* and 15*b* protruding to a lower surface 13*c* side. In the width direction Wd of the drum-shaped core 10, the leg part 15*a* on the same side as that of the leg part 14*a* of the first flange part 12 provided with the first terminal electrode 21 is provided with a third terminal electrode 23. In the width direction Wd of the drum-shaped core 10, the leg part 15*b* on the same side as that of the leg part 14*b* of the first flange part 12 provided with the second terminal electrode 22 is provided with a fourth terminal electrode 24. The third terminal electrode 23 and the fourth terminal electrode 24 are not electrically connected to each other. Each of the terminal electrodes 21 to 24 is indicated by a chain double-dashed line in FIG. 1 and FIG. 2, and is omitted in the other drawings.

The first terminal electrode 21, the second terminal electrode 22, the third terminal electrode 23, and the fourth terminal electrode 24 each include, for example, a metal layer and a plated layer on a surface of the metal layer. As a material for the metal layer, for example, a metal such as silver (Ag) or copper (Cu) or an alloy such as a nickel-chrome (Ni—Cr) alloy or a Ni—Cu alloy can be used. As a material for the plated layer, for example, a metal such as tin (Sn) or Ni or an alloy such as a Ni—Sn alloy can be adopted. The plated layer may have a multilayer structure.

The coil 30 includes a first wire 31 and a second wire 32 wound around the core part 11. One end portion of the first wire 31 is connected to the first terminal electrode 21, and the other end portion of the first wire 31 is connected to the third terminal electrode 23. One end portion of the second wire 32 is connected to the second terminal electrode 22, and the other end portion of the second wire 32 is connected to the fourth terminal electrode 24. The first wire 31 and the second wire 32 are connected to the terminal electrodes 21 to 24 by, for example, thermocompression bonding, brazing, welding, or the like. When mounted on a mount substrate, the first terminal electrode 21, the second terminal electrode 22, the third terminal electrode 23, and the fourth terminal electrode 24 are opposed to the mount substrate. Here, the core part 11 becomes parallel to a main surface of the mount substrate. That is, the coil component 1 of the present embodiment is a horizontally-wound common mode choke coil in which the coil axes of the first wire 31 and the second wire 32 are parallel to the mount substrate.

The first wire 31 and the second wire 32 are configured of a conductive line made of a good conductor such as copper (Cu), silver (Ag), or gold (Au) and an insulation coat made of polyurethane, polyamide-imide, fluorine-based resin, or the like, with which the conductive line is coated. The conductive line preferably has a diameter on the order of, for example, 15 to 100 μm. The insulation coat preferably has a thickness on the order of, for example, 3 to 20 μm. In the present embodiment, the diameter of the conductive line is approximately 30 μm, and the thickness of the insulation coat is approximately 10 μm.

The first wire 31 and the second wire 32 are wound around the core part 11 in the same direction. With this, when signals of opposite phases such as differential signals are inputted to the first wire 31 and the second wire 32, magnetic fluxes occurring by the first wire 31 and the second wire 32 are cancelled out together to weaken the operation of the coil component 1 as an inductor and let the signals of opposite phases pass through. On the other hand, when signals of the same phase such as extraneous noise are inputted to the first wire 31 and the second wire 32, magnetic fluxes occurring by the first wire 31 and the second wire 32 are reinforced together to increase the operation of the coil component 1 as an inductor and cut off the signals of the same phase. Therefore, the coil component 1 functions as a common mode choke coil which attenuates a common mode signal such as extraneous noise while decreasing a passage loss of signals in differential mode such as differential signals.

As depicted in FIG. 1 and FIG. 2, the coil component 1 of the present embodiment includes a plate-shaped core 50. The plate-shaped core 50 may be omitted. The plate-shaped core 50 has a substantially rectangular parallelepiped shape. The plate-shaped core 50 can be configured of a material similar to that of the drum-shaped core 10. When the drum-shaped core 10 and the plate-shaped core 50 are made of a magnetic material, the plate-shaped core 50 is provided so as to couple the upper surface **12*d* of the first flange part 12 and the upper surface 13*d* of the second flange part 13. With this, the drum-shaped core 10 configures a closed magnetic circuit in conjunction with the plate-shaped core 50** to improve inductance acquisition efficiency.

The drum-shaped core 10 has a length L10 in the length direction Ld of approximately 3.1 mm, a width W10 in the width direction Wd of approximately 2.4 mm, and a height T10 in the height direction Td of approximately 1.7 mm. The length L10 is a distance between the outer surfaces **12*b* and 13*b* of the first flange part 12 and the second flange part 13, the width W10 is a distance between the side surfaces 12*e* and 12*f* of the first flange part 12, and the height T10 is a distance between the lower surface 12*c* and the upper surface 12*d* of the first flange part 12. In the drum-shaped core 10, a distance from the lower surfaces 12*c* and 13*c* of the first flange part 12 and the second flange part 13 to a lower end portion of the core part 11 is approximately 0.7 mm. Also, since a distance between an isolation part where the first wire 31 and the second wire 32 branch toward the respective electrodes and connecting parts of the first wire 31 and the second wire 32 to the terminal electrodes 21, 22, 23, and 24 is ensured, a stress occurring at the isolation part is mitigated to decrease, for example, a short between the wires due to a break in the first wire 31 and the second wire 32** or a destruction of the insulation coat.

The drum-shaped core 10 is preferably cleaned chemically, thereby improving wettability of an adhesive for use in bonding to the plate-shaped core 50 and fixation power between the cores. The upper surfaces **12*d* and 13*d* of the first flange part 12 and the second flange part 13 opposed to the plate-shaped core 50 preferably have a flatness equal to or smaller than approximately 5 μm, thereby decreasing a gap occurring between the first and second flange parts 12 and 13 and the plate-shaped core 50 to reduce a decrease of the inductance value. The core part 11 has a thickness of approximately 0.6 mm at the center in the width direction Wd. The thickness of the core part 11** preferably has a thickness equal to or smaller than approximately 1 mm.

The plate-shaped core 50 has a length L50 in the length direction Ld of approximately 3.2 mm, a width W50 in the width direction Wd of approximately 2.5 mm, and a thickness T50 in the height direction Td of approximately 0.7 mm. The thickness T50 of the plate-shaped core 50 is preferably approximately 0.3 mm to 2.0 mm. With the thickness T50 being equal to or larger than approximately 0.3 mm, the inductance value can be ensured. With the thickness T50 being equal to or smaller than approximately 2.0 mm, a low profile can be achieved. The plate-shaped core 50 is preferably cleaned chemically, thereby improving wettability of the adhesive for use in bonding to the drum-shaped core 10 and fixation power between the cores. The lower surface of the plate-shaped core 50 preferably has a flatness equal to or smaller than approximately 5 μm, thereby decreasing a gap occurring between the plate-shaped core 50 and the first and second flange parts 12 and 13 to reduce a decrease of the inductance value. The plate-shaped core 50 preferably has a length and a width larger than those of the drum-shaped core 10 by approximately 0.1 mm, thereby ensuring a connection area (magnetic path) overlapping the first flange part 12 and the second flange part 13 with respect to deviations in the length direction and the width direction, which tend to occur at the time of bonding the plate-shaped core 50 to the drum-shaped core 10, to reduce a decrease of the inductance value.

Next, the coil 30 is described in detail. The coil 30 has a wound part **30*a* wound around the core part 11 and connecting parts 30*b* and 30*c* on both sides of the wound part 30*a*. The connecting parts 30*b* and 30*c* include end portions to be connected to the terminal electrodes 21 to 24 and their neighborhoods in the first wire 31 and the second wire 32. The first wire 31 and the second wire 32 are in a twisted state in which most of the first wire 31 and most of the second wire 32 are twisted together in the wound part 30*a*. The first wire 31 and the second wire 32 are wound around the core part 11 as being twisted together. The first wire 31 and the second wire 32 in the twisted state are spirally wound around the core part 11 with substantially the same number of turns. Each of the first wire 31 and the second wire 32 has an insulation coat. The first wire 31 is connected to the terminal electrodes 21 and 22, the second wire 32 is connected to the terminal electrodes 23 and 24, and the first wire 31 and the second wire 32 are not electrically connected to each other. The first wire 31 and the second wire 32 may have a portion not twisted together in a portion wound around the core part 11**.

Figure 4A:
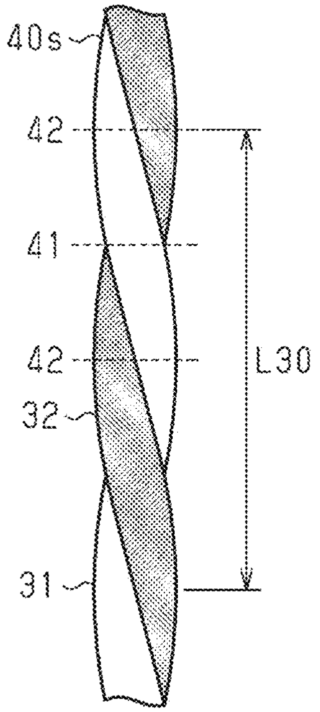
FIG. 4A and FIG. 4B are diagrams for describing twisted states of wires; \
Figure 4B:
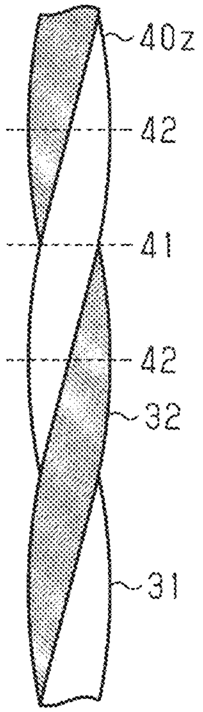

FIG. 4A and FIG. 4B each depict a twisted state of the first wire 31 and the second wire 32. In FIG. 4A and FIG. 4B, the second wire 32 is depicted as being hatched, and the first wire 31 is depicted as being hollow, thereby making the twisted state of the first wire 31 and the second wire 32 easy to understand.

FIG. 4A depicts a twisted wire part 40*s* in an S twisted state, and FIG. 4B depicts a twisted wire part 40*z* in a Z twisted state. In Z twist and S twist, directions of twisting the first wire 31 and the second wire 32 are opposite to each other.

In the first wire 31 and the second wire 32 in a twisted state, a relative difference between the first wire 31 and the second wire 32 (such as in line length or imbalance in stray capacitance) is small, thereby decreasing mode transformation in which, for example, a differential mode signal is transformed to a common mode signal in the coil component 1 or vice versa, and making mode transformation characteristics favorable. While the first wire 31 and the second wire 32 are twisted in close contact with each other in FIG. 4A, they may be twisted partially with a gap therebetween or may be twisted entirely with a gap therebetween. In the coil component 1, approximately the entire part of the wound part 30*a* of the coil 30 is the twisted wire part 40*s* or the twisted wire part 40*z*. The wound part 30*a* may be twisted in Z twist, S twist, or in a mixture of Z twist and S twist.

In the coil component 1 of the present embodiment depicted in FIG. 1 and FIG. 2, the first wire 31 and the second wire 32 in the wound part 30*a* of the coil 30 are twisted in S twist. In FIG. 4A and FIG. 4B, it is intended that the circumferential surface of the core part 11 is present at the back side of the paper. The circumferential surface of the core part 11 is the front surface of the core part 11, and includes the side surfaces 11*a* and 11*b*, the upper surfaces 11*c* and 11*d*, and the lower surfaces 11*e* and 11*f* described above. As depicted in FIG. 4A, at the twisted wire part 40*s* of the first wire 31 and the second wire 32 viewed from a direction orthogonal to the circumferential surface of the core part 11, the first wire 31 and the second wire 32 are twisted at approximately 360 degrees in a range of a length L30. That is, the number of twists of the first wire 31 and the second wire 32 is "1" in the range of the length L30. Here, the length L30 is referred to as a twisting pitch. The same goes for the twisted wire part 40*z* depicted in FIG. 4B.

Also, it is intended in FIG. 4A and FIG. 4B that the circumferential surface of the core part 11 is present at the back side of the paper. In the direction orthogonal to the circumferential surface of the core part 11, a portion where the first wire 31 and the second wire 32 overlap each other is taken as a knot part 41. At the knot part 41, the first wire 31 and the second wire 32 are aligned in a direction perpendicular to the circumferential surface of the core part 11. In the direction orthogonal to the circumferential surface of the core part 11, a portion where the first wire 31 and the second wire 32 do not overlap each other and are in a horizontally aligned state is taken as a swell part 42. This swell part 42 is a portion where the first wire 31 and the second wire 32 overlap each other in a direction parallel to the circumferential surface of the core part 11.

FIG. 3 depicts a cross section of the coil component 1, which is orthogonal to the axial direction of the core part 11. In FIG. 3, the plate-shaped core 50 depicted in FIG. 1 and FIG. 2 is omitted. As depicted in FIG. 3, the core part 11 of the drum-shaped core 10 has the side surfaces 11*a* and 11*b*, the upper surfaces 11*c* and 11*d*, and the lower surfaces 11*e* and 11*f*, as described above. Also in FIG. 3, a portion of one turn of the coil 30 is depicted. While the first wire 31 and the second wire 32 are depicted in a ring form in FIG. 3, in actuality, the first wire 31 and the second wire 32 are spirally wound around the core part 11.

The twisted wire parts 40*a* and 40*b* on the side surfaces 11*a* and 11*b* parallel to each other are identical in shape. The twisted wire parts 40*a* and 40*b* form a shape with two wires twisted when the twisted wire parts 40*a* and 40*b* are viewed in a predetermined direction. In the present embodiment, the twisted wire parts 40*a* and 40*b* respectively include one knot part 41*a* and one knot part 41*b*, and the swell parts 42 on both sides of each of the knot parts 41*a* and 41*b* are respectively disposed at ridge portions between the side surfaces 11*a* and 11*b* and the upper surfaces 11*c* and 11*d* and the lower surfaces 11*e* and 11*f* adjacent to the side surfaces 11*a* and 11*b*. Therefore, the twisted wire parts 40*a* and 40*b* are identical in shape. Here, "identical in shape" means that two twisted wire parts have the same positional relation between the knot part and the swell part. The twisted wire parts identical in shape may have the first wire 31 and the second wire 32 switched or may have different gradients with respect to the drum-shaped core 10, when viewed from the direction orthogonal to the circumferential surface of the core part 11. Therefore, the number of knot parts and swell parts at the twisted wire part 40*a* is identical to the number of knot parts and swell parts at the twisted wire part 40*b*.

In at least one turn, the coil 30 of the present embodiment has one knot part on each of the side surfaces 11*a* and 11*b* and the surfaces 11*c* to 11*f* configuring the circumferential surface of the core part 11 and has a swell part at each ridge part between the surfaces. Of the surfaces of the core part 11, at least one surface may include a turn having two or more knot parts. Of the surfaces of the core part 11, at least one surface may include a turn without a knot part.

In detail, the coil 30 in one turn has the twisted wire parts 40*a* and 40*b* and twisted wire parts 40*c* to 40*f* corresponding to the side surfaces 11*a* and 11*b* and the surfaces 11*c* to 11*f* configuring the circumferential surface of the core part 11. The twisted wire parts 40*a* to 40*f* respectively have knot part parts 41*a* to 41*f*. Also, in the coil 30 in one turn, the swell part 42 is disposed at the ridge parts between the side surfaces 11*a* and 11*b* and the upper surfaces 11*c* and 11*d*, the ridge parts between the side surfaces 11*a* and 11*b* and the lower surfaces 11*e* and 11*f*, the ridge part between the upper surfaces 11*c* and 11*d*, and the ridge part between the lower surfaces 11*e* and 11*f*. The first wire 31 and the second wire 32 are in a horizontally aligned state at the swell part 42 in which the first wire 31 and the second wire 32 do not overlap each other in the direction orthogonal to the circumferential surface of the core part 11. At each ridge part, the first wire 31 and the second wire 32 are in contact with the core part 11. Therefore, the first wire 31 and the second wire 32 are stably wound around the core part 11, and winding irregularities do not occur.

Also, on a cross section of the core part 11, sides configuring that cross section are equal to one another in length. Therefore, the twisted wire parts 40*a*, 40*b*, 40*c*, 40*d*, 40*e*, and 40*f* on the surfaces (side surfaces 11*a* and 11*b*, the upper surfaces 11*c* and 11*d*, and the lower surfaces 11*e* and 11*f*), respectively, are equal to one another in length (the direction in which the coil 30 is wound around the core part 11 along the circumferential direction thereof). Thus, in one turn of the coil 30, spacings (pitches) among the knot parts 41*a*, 41*b*, 41*c*, 41*d*, 41*e*, and 41*f* in the circumferential direction of the core part 11, that is, the winding direction of the coil 30, are equal.

As depicted in FIG. 1, on the side surface 11*a*, the swells of the twisted wire part 40*a* adjacent to each other are disposed so as to be horizontally aligned in the axial direction of the core part 11. As depicted in FIG. 2, as with the side surface 11*a*, also on the lower surfaces 11*e* and 11*f*, the swells of the twisted wire parts 40*e* and 40*f* adjacent to each other are disposed so as to be horizontally aligned in the axial direction of the core part 11. Although omitted in the drawings, the swells of the twisted wire parts 40*b*, 40*c*, and 40*d* are also disposed adjacently to each other in a similar manner on the side surface 11*b* and the upper surfaces 11*c* and 11*d*, respectively. In this manner, with the swells of the twisted wire parts 40*a* to 40*f* adjacent to each other horizontally aligned, imbalance in stray capacitance is decreased, and mode transformation characteristics can be improved.

In the coil component 1 of the present embodiment, the first wire 31 and the second wire 32 are each wound around the core part 11 as being in a horizontally aligned state at each ridge part of the core part 11 to form the swell part 42. Therefore, winding irregularities do not occur even with a lapse of time after winding, and a stable wound state can be kept.

(Wire Winding Method)

Figure 7:
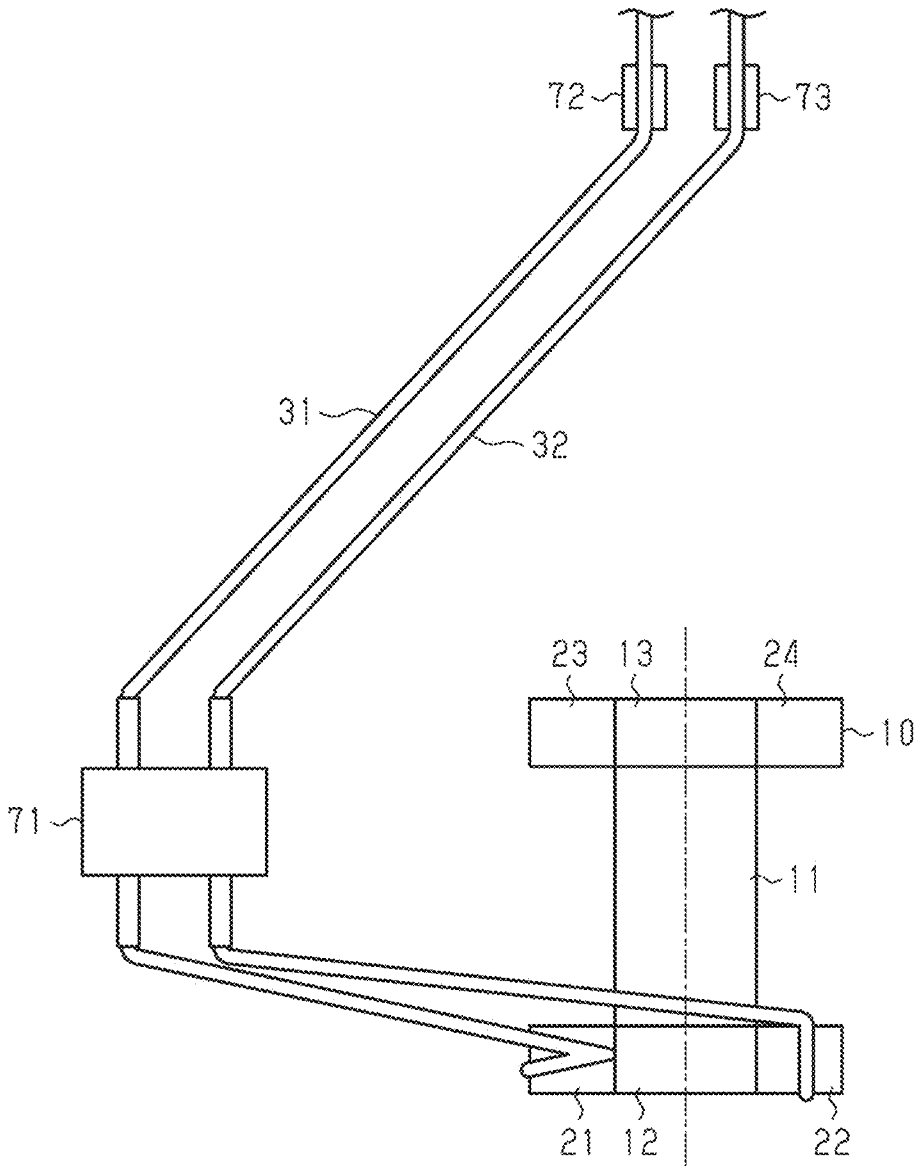
FIG. 7 is a diagram for describing main parts of a winding apparatus for winding wires around the drum-shaped core.

A winding method for the above-described coil 30 is described. FIG. 7 depicts main parts of a winding apparatus for winding the first wire 31 and the second wire 32 around the drum-shaped core 10.

The winding apparatus has a nozzle 71 and tensioners 72 and 73. First, the first wire 31 and the second wire 32 are drawn through the tensioners 72 and 73, respectively, and then the nozzle 71, and the tip portions of the first wire 31 and the second wire 32 are connected to the drum-shaped core 10. The first wire 31 and the second wire 32 are drawn out from a coil bobbin not depicted. The tensioner 72 applies tension to the first wire 31. The tensioner 73 applies tension to the second wire 32.

Figure 8:
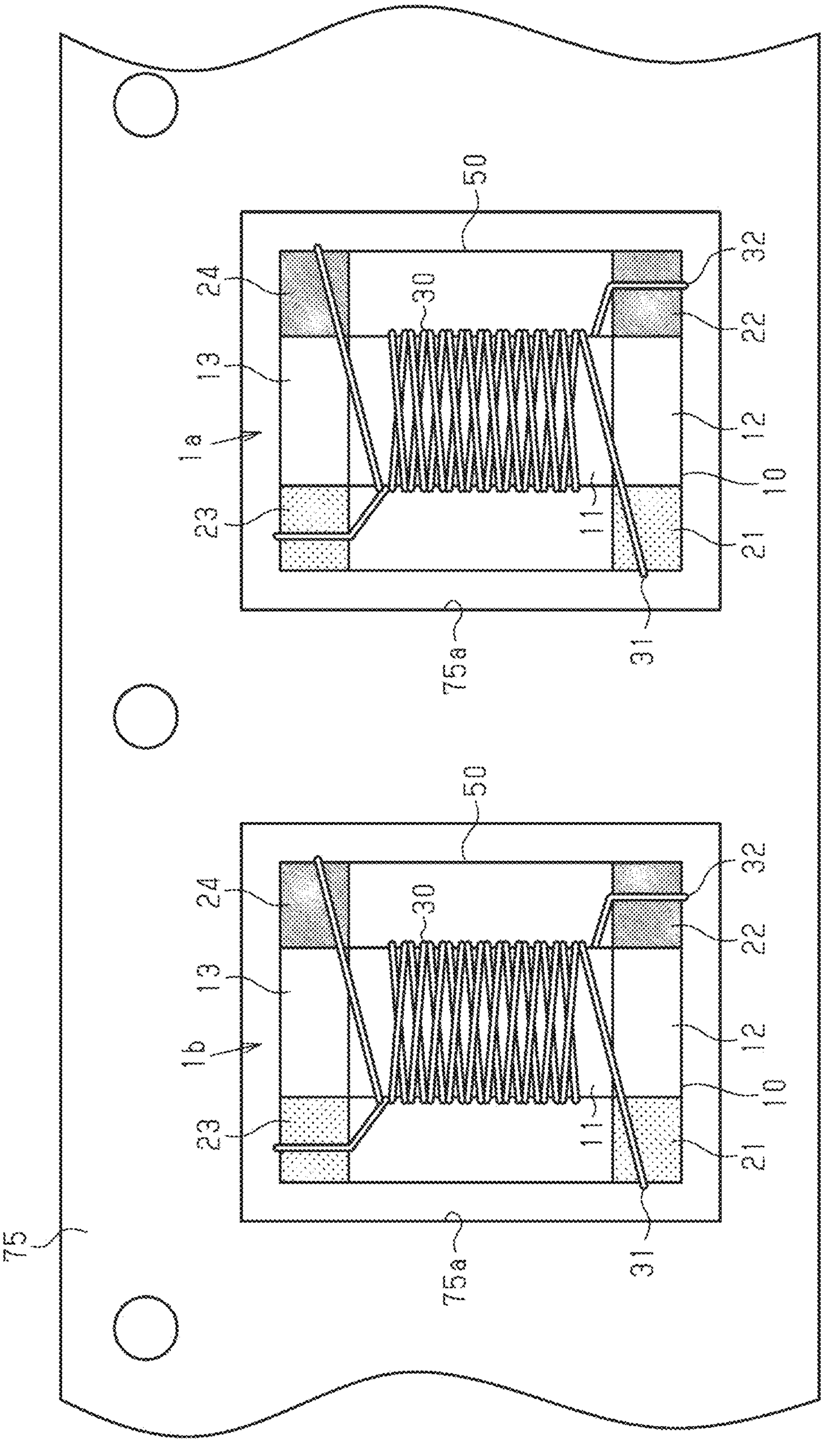
FIG. 8 is a partially-enlarged view of a series of taping electronic components, with a cover tape omitted therefrom.

Next, the nozzle 71 is revolved around the periphery of the drum-shaped core 10 to twist and wind the first wire 31 and the second wire 32 around the drum-shaped core 10. Depending on the revolving direction of the nozzle 71, the first wire 31 and the second wire 32 can be twisted in S twist depicted in FIG. 4A and in Z twist depicted in FIG. 4B. By changing the revolving direction of the nozzle 71, as depicted in FIG. 8, a first coil component 1*a* and a second coil component 1*b* in different twisted states (S twist and Z twist) can be manufactured. The first coil component 1*a* and the second coil component 1*b* are each accommodated in a recessed part 75*a* of a carrier tape 75 depicted in FIG. 8. On the carrier tape 75, a cover tape not depicted is laminated with an adhesive or the like to prevent falling of the coil components 1*a* and 1*b*. In FIG. 8, the coil 30 is depicted in a simplified manner for ease of understanding the twisted states (S twist and Z twist) of the coil 30 in each of the coil components 1*a* and 1*b*. When winding is successively performed on a plurality of coil components, kinks may occur due to twisting of the first wire 31 and the second wire 32 per se. By changing the revolving direction of the nozzle 71, torsion can be left less in the first wire 31 and the second wire 32, and thus the occurrence of kinks in the first wire 31 and the second wire 32 can be reduced.

Then, while the nozzle 71 is revolved around the periphery of the drum-shaped core 10, the drum-shaped core 10 is rotated in the same direction as the revolving direction of the nozzle 71. When the drum-shaped core 10 is not rotated, the first wire 31 and the second wire 32 are wound around the core part 11 of the drum-shaped core 10 by the revolution of the nozzle 71, with a number of twists being "1", that is, with two knot parts 41 formed. Therefore, by adjusting the revolution of the nozzle 71 and the rotation of the drum-shaped core 10, the twisted state and the positions of the knot parts and the swell parts can be adjusted in accordance with each size of the surface in the core part 11. In this manner, to each of the surfaces 11*a* to 11*f* configuring the circumferential surface of the core part 11 of the drum-shaped core 10, one or more (one in the present embodiment) knot parts 41*a* to 41*f* (refer to FIG. 3) are formed, respectively. Also, by setting pitches of the knot parts 41*a* to 41*f*, the first wire 31 and the second wire 32 can be wound around the core part 11 of the drum-shaped core 10.

(Method of Forming the Drum-Shaped Core 10)

Next, one example of a process of forming the drum-shaped core 10 is described. In this forming process, a compact which will become the drum-shaped core 10 is formed. That compact is described, with the same reference numerals as those of the drum-shaped core 10 provided thereto.

Figure 9B:
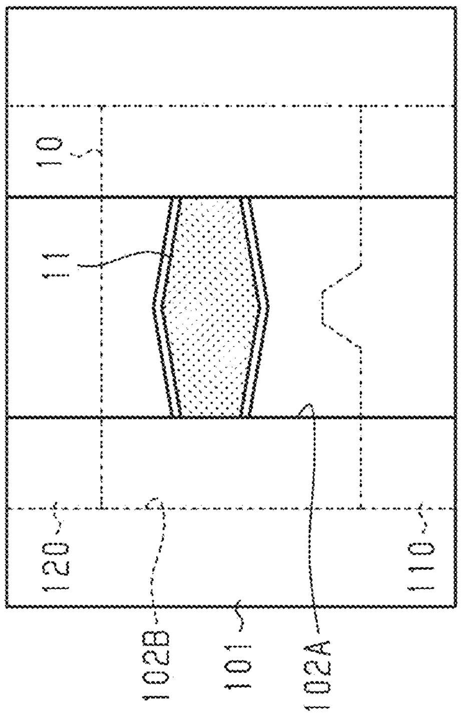
FIG. 9B is a schematic view of a die, punches, and a drum-shaped core of the core part viewed in an axial direction of the core part.
Figure 9C:
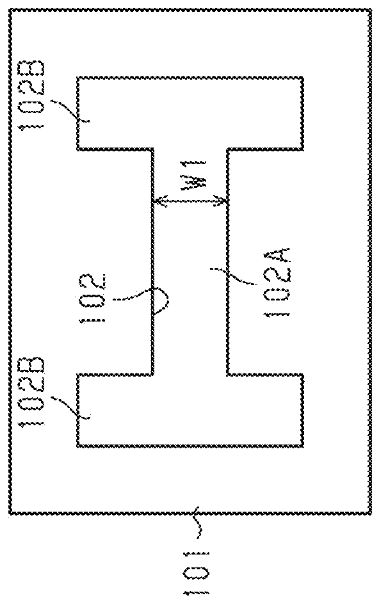
FIG. 9C is a schematic plan view of a filling hole of the die.
Figure 9A:
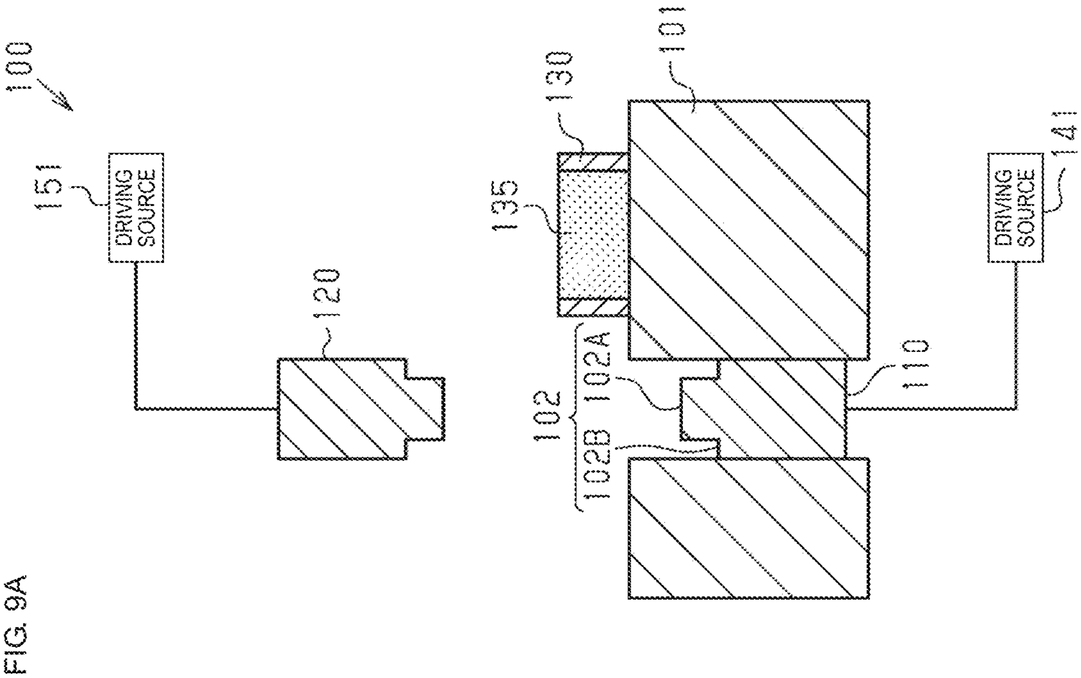
FIG. 9A is a schematic view of a powder compacting apparatus.

As depicted in FIG. 9A, a powder compacting apparatus 100 has a metal mold (a die 101, a lower punch 110, and an upper punch 120) and a feeder 130. In the die 101, a filling hole 102 penetrating in the height direction Td is formed. As depicted in FIG. 9C, the filling hole 102 is formed in a substantially same H shape as the shape of the drum-shaped core 10 depicted in FIG. 1, FIG. 2, FIG. 5, and FIG. 6 when viewed from the height direction Td. That is, the filling hole 102 has a filling part 102A corresponding to the core part 11 depicted in FIG. 1, FIG. 2, and FIG. 5 and filling parts 102B corresponding to the paired flange parts 12 and 13.

As depicted in FIG. 9A, the lower punch 110 is driven (to descend or ascend) by a driving source 141. The upper punch 120 is driven (to descend or ascend) by a driving source 151. As the driving sources 141 and 151, for example, servo motors can be used.

The feeder 130 is formed in a substantially box shape. The feeder 130 is slidably provided on the upper surface of the die 101 along that upper surface. By the feeder 130, powder 135 is supplied to the filling hole 102. That powder 135 is compressed by the lower punch 110 and the upper punch 120 to form the compact 10. The compact 10 is sintered to acquire the drum-shaped core 10 depicted in FIG. 1, FIG. 2, and FIG. 5.

FIG. 9B depicts the metal mold (the die 101, the lower punch 110, and the upper punch 120) and the compact 10 at the time of compression. The core part 11 of the compact 10 is formed in a shape having a cross section in a desired substantially polygonal shape (substantially hexagonal shape in the present embodiment) by the filling part 102A of the die 101, the lower punch 110, and the upper punch 120. The lower punch 110 and the upper punch 120 form the lower surfaces 11*e* and 11*f* and the upper surfaces 11*c* and 11*d* depicted in FIG. 3. The die 101 forms the paired side surfaces 11*a* and 11*b* parallel to each other depicted in FIG. 3.

As described in the foregoing, according to the present embodiment, the following effects can be achieved. (1) The coil component 1 includes the drum-shaped core 10 including the core part 11, the core part 11 having the circumferential surface including the side surfaces 11*a* and 11*b* parallel to each other, and the coil 30 including the two wires 31 and 32 wound around the core part 11 in the same direction. The coil 30 has the twisted wire part 40*a* having the two wires 31 and 32 twisted together on the side surface 11*a* and the twisted wire part 40*b* having the two wires 31 and 32 twisted together on the side surface 11*b*, and the twisted wire part 40*a* and the twisted wire part 40*b* are identical in shape. In this manner, in the first wire 31 and the second wire 32, the twisted wire part 40*a* of the side surface 11*a* and the twisted wire part 40*b* of the side surface 11*b* are identical in shape, and winding irregularities can be thus reduced.

The coil 30 has the twisted wire parts 40*a* and 40*b* with the two wires 31 and 32 twisted together, and the two wires 31 and 32 are in a horizontally aligned state of not overlapping each other in the direction orthogonal to the circumferential surface of the core part 11 at the ridge parts between the side surfaces 11*a* and 11*b* and the upper surfaces 11*c* and 11*d* and the ridge parts between the side surfaces 11*a* and 11*b* and the lower surfaces 11*e* and 11*f*.

(2) In the coil component 1, the first wire 31 and the second wire 32 are wound around the core part 11, as being in a horizontally aligned state at each ridge part of the core part 11 to become the swell part 42. Therefore, winding irregularities do not occur even with a lapse of time after winding, and a stable wound state can be kept.

MODIFICATION EXAMPLES

The above-described embodiment may be implemented in the following modes. In the above-described embodiment, the wound state may be changed as appropriate.

Figure 10:
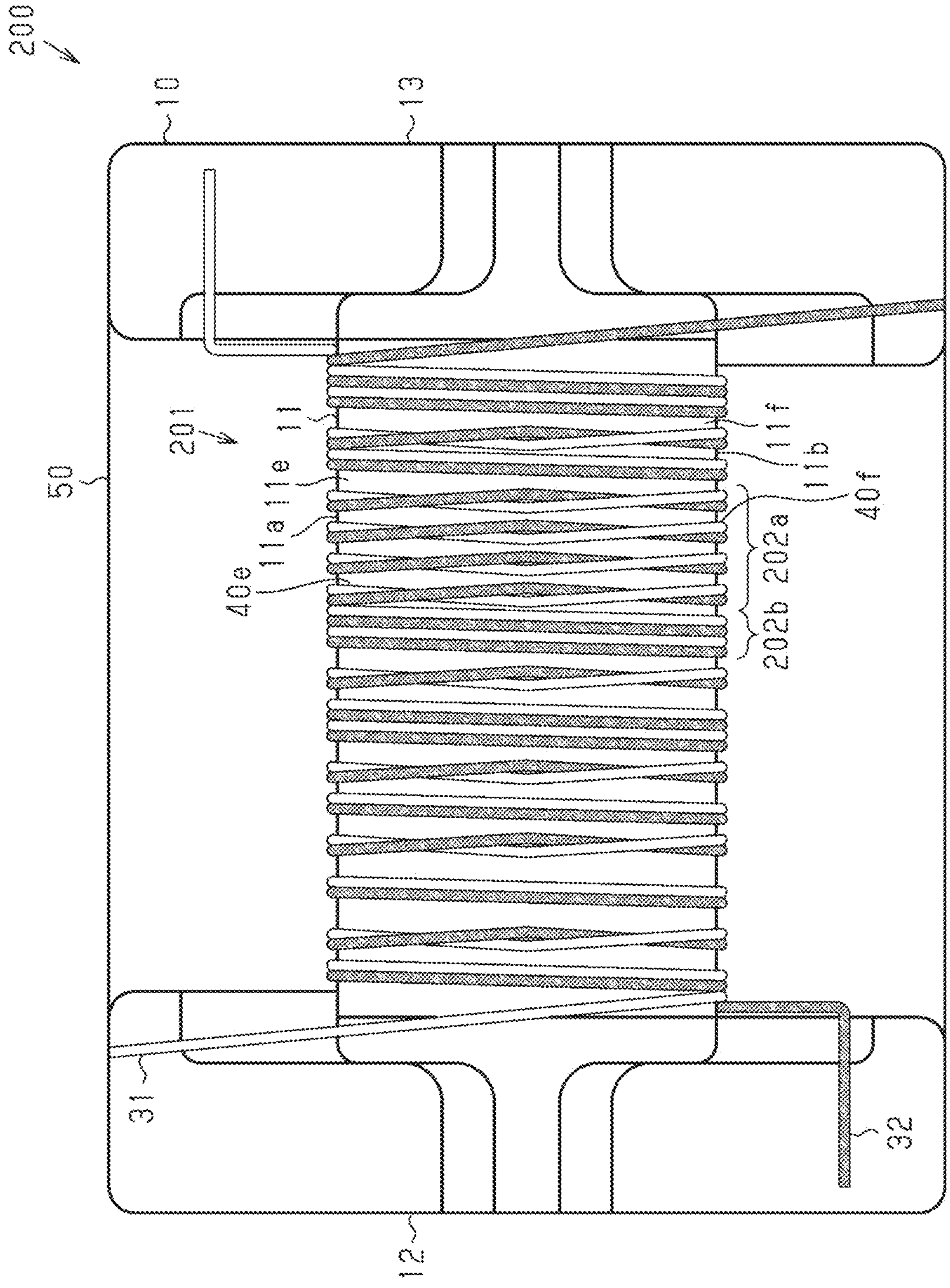
FIG. 10 is a schematic bottom view of a coil component of a modification example.

A coil 201 of a coil component 200 depicted in FIG. 10 partially has twisted wire parts. For example, in a region 202*a*, the plurality of twisted wire parts 40*e* and 40*f* are disposed adjacently to each other on the lower surfaces 11*e* and 11*f* of the core part 11. Meanwhile, in a region 202*b*, the first wire 31 and the second wire 32 are wound on the lower surfaces 11*e* and 11*f* of the core part 11 in a side-by-side state, that is, in a state of not being twisted together. That is, at the ridge part between the lower surface 11*e* and the lower surface 11*f*, the first wire 31 and the second wire 32 are in a state of being side by side. Although not depicted, the side surfaces 11*a* and 11*b* parallel to each other also have the twisted wire parts 40*a* and 40*b* identical in shape and a portion in which they are wound in a state of not being twisted together. Also in the coil component 200 in this wound state partially having twisted wire parts, the shapes of the twisted wire parts are partially identical in shape, and thus winding irregularities can be reduced. At the ridge part, the first wire 31 and the second wire 32 are wound around the core part 11 in a state of being side by side, and thus the wound state can be stabilized.

Figure 11:
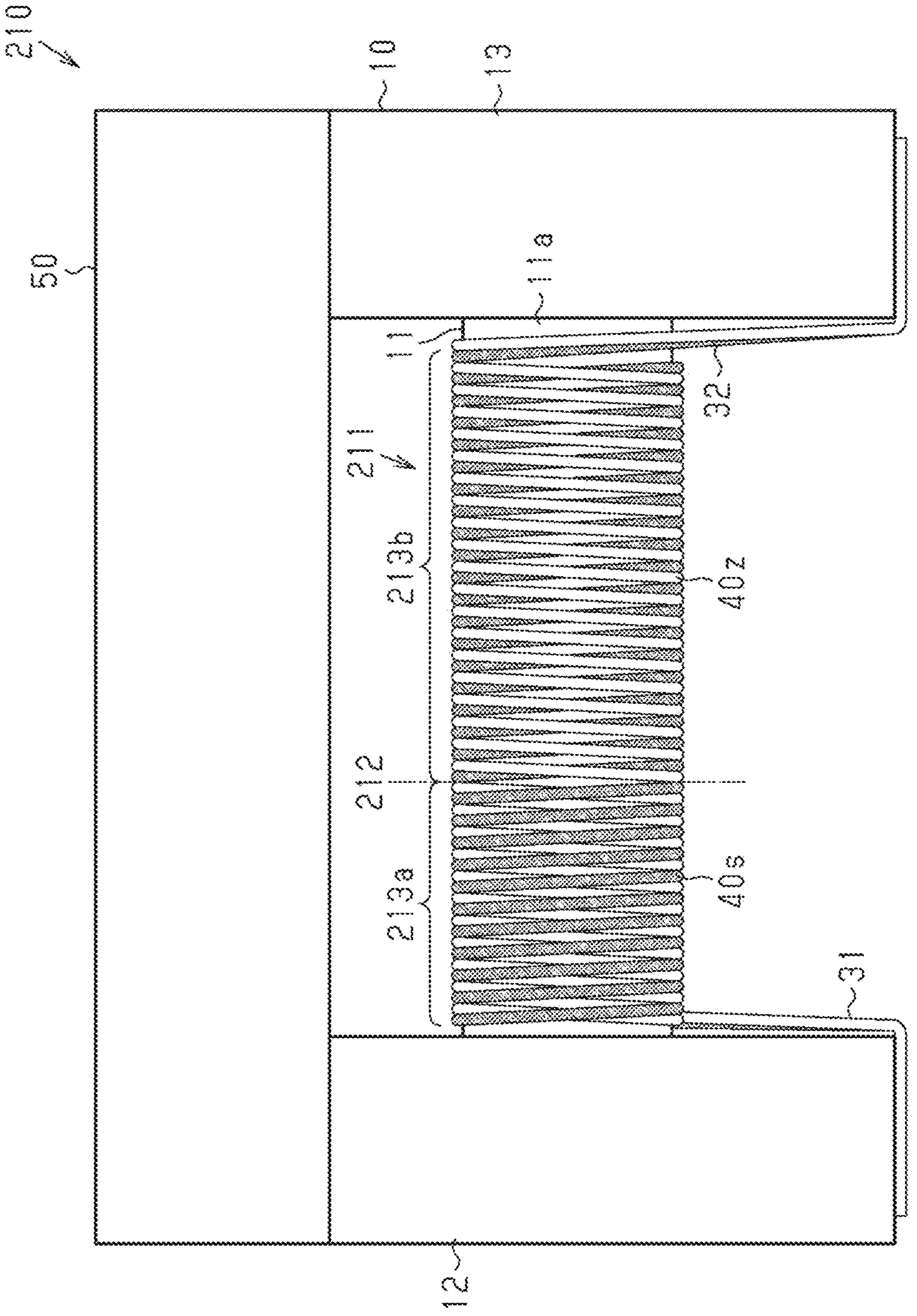
FIG. 11 is a schematic side view of the coil component of the modification example.
Figure 12:
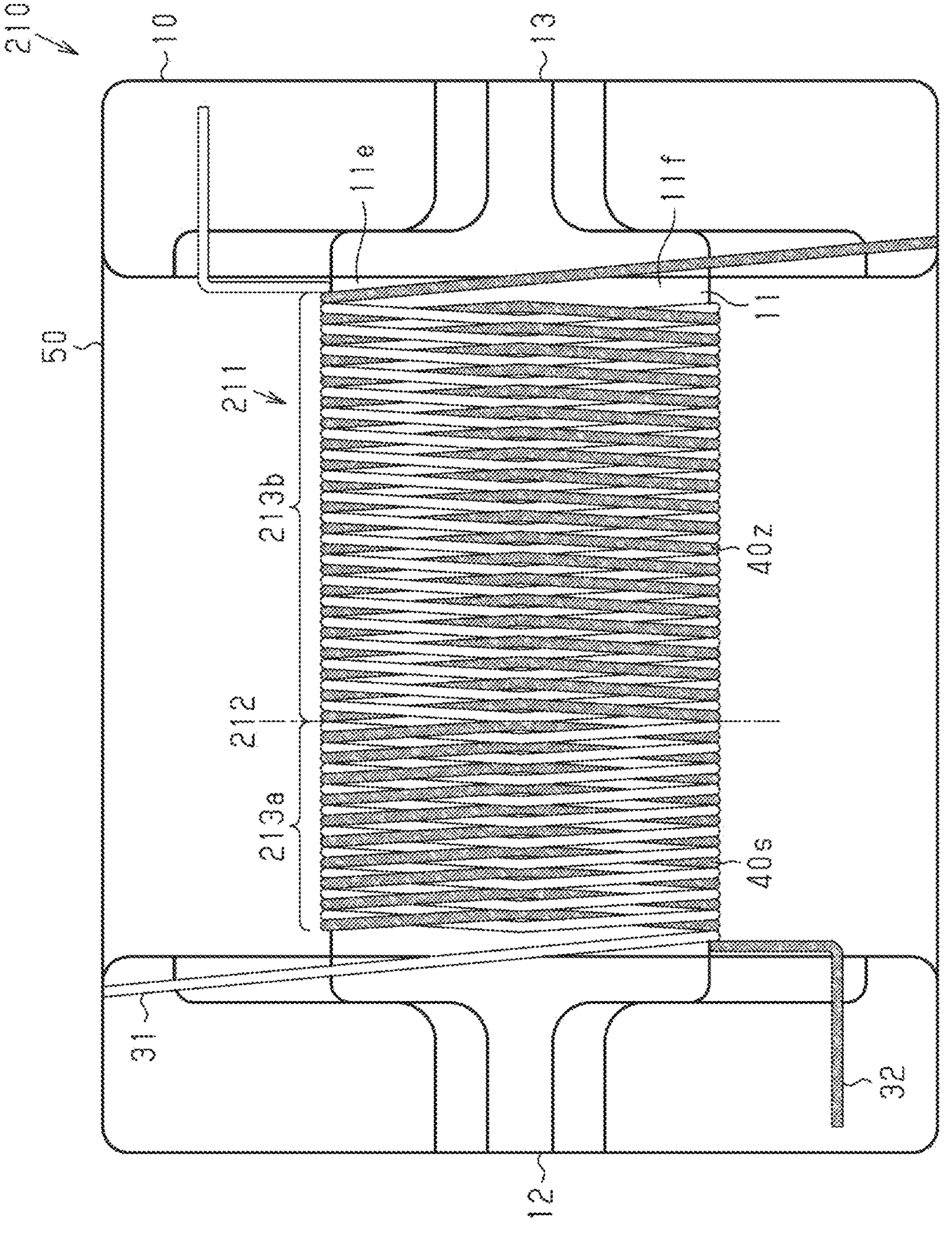
FIG. 12 is a schematic bottom view of the coil component of FIG. 11.

A coil 211 of a coil component 210 depicted in FIG. 11 and FIG. 12 has a reversed part 212. The coil 211 has a first region 213*a* and a second region 213*b* across the reversed part 212. In the first region 213*a*, twisted wire parts 40*s* in S twist are disposed so as to be adjacent to each other. In the second region 213*b*, twisted wire parts 40*z* in Z twist are disposed so as to be adjacent to each other. In this manner, with the twisted wire parts 40*s* in S twist and the twisted wire parts 40*z* in Z twist disposed to one coil component 210, in addition to the effects of the above-described embodiment, torsion, kinks, and so forth of the first wire 31 and the second wire 32 can be reduced. The position of the reversed part 212 can be changed as appropriate. While the number of turns in the first region 213*a* and the number of turns in the second region 213*b* are different in FIG. 11 and FIG. 12, if the first region 213*a* and the second region 213*b* have the same number of turns, torsion, kinks, and so forth of the first wire 31 and the second wire 32 can be more reduced.

Figure 13A:
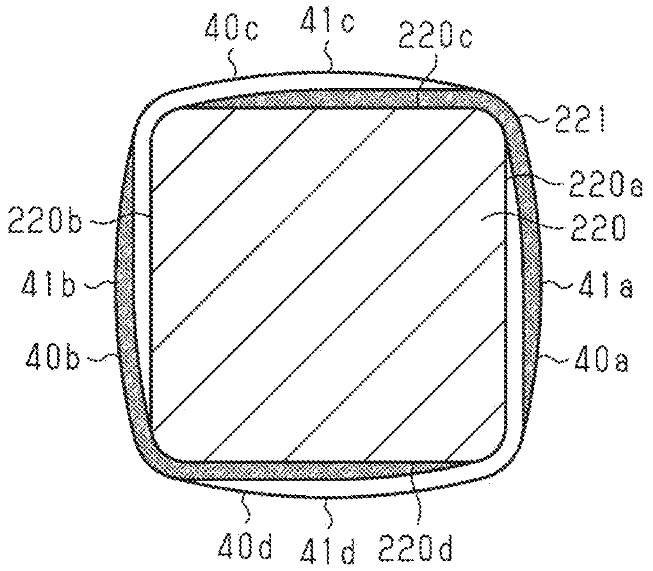
FIG. 13A and FIG. 13B are schematic cross-sectional views of a core part and wires of modification examples.

In the above-described embodiment, the shape of the cross section of the core part may be changed as appropriate. A core part 220 depicted in FIG. 13A is formed to have a substantially quadrangular cross section, and has side surfaces 220*a* and 220*b* parallel to each other, an upper surface 220*c*, and a lower surface 220*d*. A coil 221 wound around the core part 220 has twisted wire parts 40*a*, 40*b*, 40*c*, and 40*d* corresponding to these side surfaces 220*a* and 220*b*, the upper surface 220*c*, and the lower surface 220*d*. The twisted wire parts 40*a*, 40*b*, 40*c*, and 40*d* respectively have knot parts 41*a*, 41*b*, 41*c*, and 41*d*. In the core part 220 having the above-described cross section, the twisted wire parts 40*a* and 40*b* corresponding to the side surfaces 220*a* and 220*b* are identical in shape, and the twisted wire parts 40*c* and 40*d* corresponding to the upper surface 220*c* and the lower surface 220*d* are identical in shape. A swell part is disposed at a ridge part between the surfaces. Thus, as with the above-described embodiment, winding irregularities of the coil 221 can be reduced, and the wound state can be stabilized.

Figure 13B:
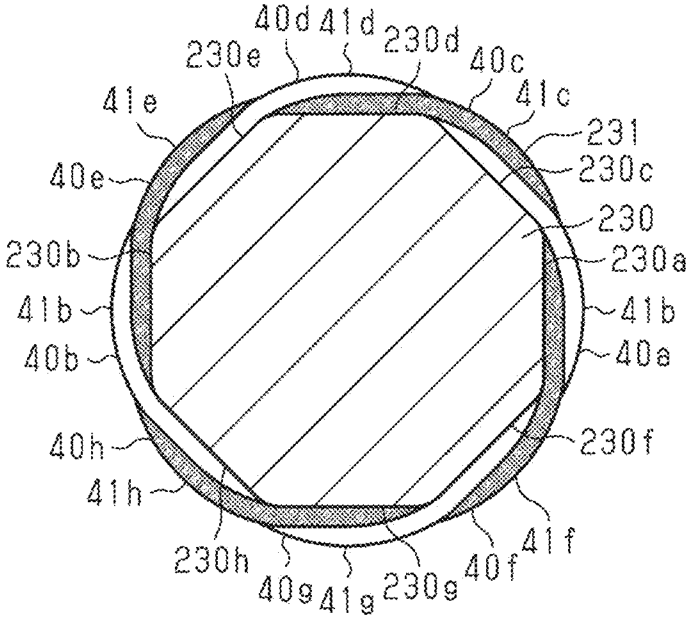

A core part 230 depicted in FIG. 13B is formed to have a substantially octagonal cross section, and has side surfaces 230*a* and 230*b* parallel to each other, upper surfaces 230*c*, 230*d*, and 230*e*, and lower surfaces 230*f*, 230*g*, and 230*h*. A coil 231 wound around the core part 230 has twisted wire parts 40*a*, 40*b*, 40*c* to 40*e*, and 40*f* to 40*h* corresponding to these side surfaces 230*a* and 230*b*, the upper surfaces 230*c* to 230*e*, and the lower surfaces 230*f* to 230*h*. The twisted wire parts 40*a*, 40*b*, 40*c* to 40*e*, and 40*f* to 40*h* respectively have knot parts 41*a*, 41*b*, 41*c* to 41*e*, and 41*f* to 41*h*. In the core part 230 having the above-described cross section, the twisted wire parts 40*a* and 40*b* corresponding to the side surfaces 230*a* and 230*b* are identical in shape, and the twisted wire parts 40*c* to 40*e* and 40*f* to 40*h* corresponding to the upper surfaces 230*c* to 230*e* and the lower surfaces 230*f* to 230*h* are identical in shape. A swell part is disposed at a ridge part between the surfaces. Thus, as with the above-described embodiment, winding irregularities of the coil 231 can be reduced, and the wound state can be stabilized.

Figure 14:
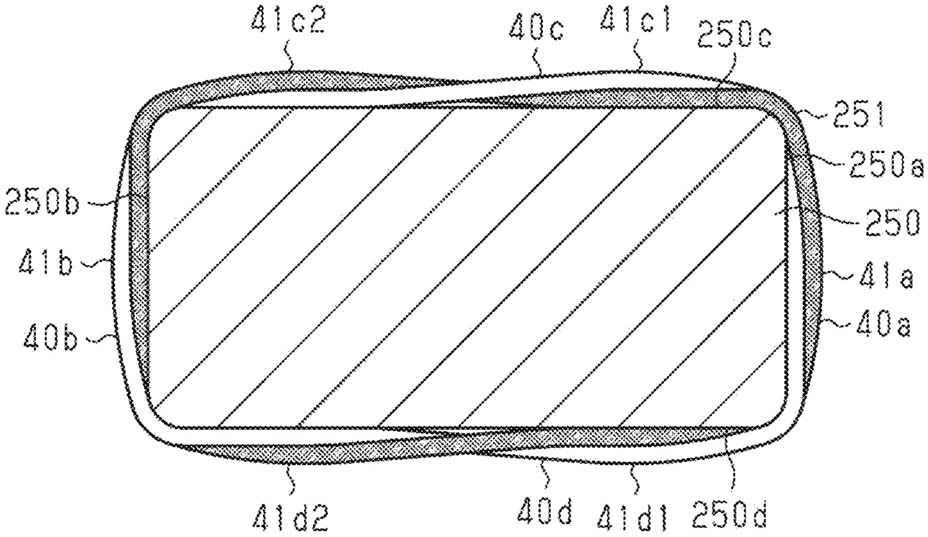
FIG. 14 is a schematic cross-sectional view of the core part and wires of a modification example.

A core part 250 depicted in FIG. 14 is formed to have a substantially quadrangular cross section, and has side surfaces 250*a* and 250*b* parallel to each other, an upper surface 250*c*, and a lower surface 250*d*. In a circumferential direction of the core part 250, the length of the upper surface 250*c* and the lower surface 250*d* is longer than the length of the side surfaces 250*a* and 250*b*. That is, this core part 250 has a substantially rectangular cross section. A coil 251 wound around the core part 250 has twisted wire parts 40*a*, 40*b*, 40*c*, and 40*d* corresponding to these side surfaces 250*a* and 250*b*, the upper surface 250*c*, and the lower surface 250*d*. The twisted wire parts 40*a* and 40*b* respectively have one knot part 41*a* and one knot part 41*b*. The twisted wire parts 40*c* and 40*d* respectively have two knot parts 41*cl* and 41*c*2 and two knot parts 41*d*1 and 41*d*2. In the core part 250 having the above-described cross section, the twisted wire parts 40*a* and 40*b* corresponding to the side surfaces 250*a* and 250*b* are identical in shape, and the twisted wire parts 40*c* and 40*d* corresponding to the upper surface 250*c* and the lower surface 250*d* are identical in shape. A swell part is disposed at a ridge part between the surfaces. Thus, as with the above-described embodiment, winding irregularities of the coil 251 can be reduced, and the wound state can be stabilized.

The shape of the cross section of the core part is not limited to those in the embodiment and each modification example described above, and can be changed as appropriate. For example, the core part may have a substantially pentagonal cross section. Also when the core part is formed to have a substantially pentagonal cross section, on the side surfaces parallel to each other, twisted wire parts corresponding thereto can be identical in shape. Thus, as with the above-described embodiment, winding irregularities of the coil can be reduced, and the wound state can be stabilized. In this case, wires may be wound so as to have one or two or more knot parts at the twisted wire part on the upper surface of the core part. Also, wires may be wound so as to have one or two or more knot parts at the twisted wire part on the lower surface of the core part.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a drum-shaped core including a core part, the core part having a circumferential surface including a first surface and a second surface parallel to each other; and a coil including two wires wound around the core part in the same direction which is a winding direction, wherein the coil includes multiple twisted wire parts with the two wires twisted together, each of the twisted wire parts is on each of surfaces configuring the circumferential surface respectively, the twisted wire part on the first surface and the twisted wire part on the second surface are identical in shape, a ridge part is defined as a boundary between two adjacent surfaces of the circumferential surface in a circumferential direction of the core part, a knot part is defined as a location where the two wires overlap each other in a direction orthogonal to the circumferential surface, and when an area where the two wires do not overlap each other in a direction orthogonal to the circumferential surface is defined as a swell part, all of the ridge parts have a swell part disposed thereon, each of the twisted wire parts includes at least one knot part, the coil has multiple of the knot parts spaced equidistantly in the winding direction of the wires, and in a cross-section orthogonal to an axial direction of the core part, every side length configuring the cross-section is an integer multiple of the spacing between multiple knot parts in the winding direction of the wires.

2. The coil component according to claim 1, wherein the first surface and second surface are surfaces configured by one pair of side faces during molding of the core part.

3. The coil component according to claim 1, wherein multiple neighboring twisted wire parts are either on top of the first surface or on top of the second surface.

4. The coil component according to claim 1, wherein the coil has a reversed part in which a twisting direction is reversed.

* * * * *